US009968918B2

(12) United States Patent
Gao et al.

(10) Patent No.: US 9,968,918 B2
(45) Date of Patent: *May 15, 2018

(54) CATALYTIC CRACKING CATALYST FOR HIGH-EFFICIENCY CONVERSION OF HEAVY OIL AND PREPARATION METHOD THEREOF

(75) Inventors: Xionghou Gao, Beijing (CN); Haitao Zhang, Beijing (CN); Di Li, Beijing (CN); Zhengguo Tan, Beijing (CN); Hongchang Duan, Beijing (CN); Xueli Li, Beijing (CN); Chaowei Liu, Beijing (CN); Yunfeng Zheng, Beijing (CN); Xiaoliang Huang, Beijing (CN); Jinjun Cai, Beijing (CN); Zhishuang Pan, Beijing (CN); Xueqin Sun, Beijing (CN)

(73) Assignee: PETROCHINA COMPANY LIMITED, Beijing (CN)

( * ) Notice: Subject to any disclaimer, the term of this patent is extended or adjusted under 35 U.S.C. 154(b) by 594 days.

This patent is subject to a terminal disclaimer.

(21) Appl. No.: 14/404,776

(22) PCT Filed: Jul. 27, 2012

(86) PCT No.: PCT/CN2012/001008
§ 371 (c)(1),
(2), (4) Date: Jan. 15, 2015

(87) PCT Pub. No.: WO2013/177728
PCT Pub. Date: May 12, 2013

(65) Prior Publication Data
US 2015/0165428 A1    Jun. 18, 2015

(30) Foreign Application Priority Data
Jun. 1, 2012  (CN) .......................... 2012 1 0179961

(51) Int. Cl.
*B01J 29/06*     (2006.01)
*B01J 29/85*     (2006.01)
(Continued)

(52) U.S. Cl.
CPC .............. *B01J 29/85* (2013.01); *B01J 21/16* (2013.01); *B01J 29/084* (2013.01); *B01J 29/088* (2013.01);
(Continued)

(58) Field of Classification Search
CPC ........ B01J 29/088; B01J 29/084; B01J 29/80; B01J 2229/40; B01J 2229/146;
(Continued)

(56) References Cited

U.S. PATENT DOCUMENTS

2010/0298118 A1   11/2010  Tan
2011/0207984 A1   8/2011   Almeida et al.

FOREIGN PATENT DOCUMENTS

CN    1217231 A    5/1999
CN    1223906 A    7/1999
(Continued)

OTHER PUBLICATIONS

Machine translation of CN 102133542, Shanxiang et al., Jul. 27, 2011.*
Machine translation of CN 101284243, Lingping et al., Oct. 15, 2008.*
Machine translation of CN 1506161, Liu et al., Jun. 23, 2004.*
First Office Action received in related Japanese Patent Application No. 2015-514313 dated Dec. 3, 2015 (3 pages).
Second Office Action received in related Chinese Patent Application No. 201210179961.4 dated Apr. 8, 2015 and English translation (6 pages).
Extended European Search Report received in related European Application No. 12377707 dated Feb. 5, 2016 (9 pages).
English Language translation of CN1506161 (cited in IDS dated Jan. 15, 2015) published Jun. 23, 2004.
(Continued)

*Primary Examiner* — Elizabeth D Wood
(74) *Attorney, Agent, or Firm* — Meunier Carlin & Curfman LLC

(57) ABSTRACT

The present invention provides a catalytic cracking catalyst for heavy oil and preparation methods thereof. The catalyst comprises 2 to 50% by weight of a phosphorus-containing ultrastable rare earth Y-type molecular sieve, 0.5 to 30% by weight of one or more other molecular sieves, 0.5 to 70% by weight of clay, 1.0 to 65% by weight of high-temperature-resistant inorganic oxides, and 0.01 to 12.5% by weight of a rare earth oxide. The phosphorus-containing ultra-stable rare earth Y-type molecular sieve uses a NaY molecular sieve as a raw material. The raw material is subjected to a rare-earth exchange and a dispersing pre-exchange; the molecular sieve slurry is then filtered, washed with water and subjected to a first calcination to obtain a rare earth sodium Y molecular sieve which has been subjected to such "first-exchange first-calcination", wherein the steps of rare earth exchange and dispersing pre-exchange are not restricted in sequence; and then the rare earth sodium Y molecular sieve which has been subjected to "one-exchange one-calcination" is subjected to "second exchange and second calcination" including ammonium exchange and a phosphorus modification, wherein the steps of the ammonium exchange and the phosphorus modification are not restricted in sequence. The steps of the ammonium exchange and the phosphorus modification can be conducted continuously or non-continuously, the second calcination is conducted after the ammonium exchange for reducing sodium, the phosphorus modification can be conducted before or after the second calcination. The catalyst provided by the invention has the characteristics of high heavy oil conversion capacity, high total liquid yield, and high yield of light oil.

20 Claims, No Drawings

(51) Int. Cl.
*C01B 39/24* (2006.01)
*C01B 39/02* (2006.01)
*B01J 35/10* (2006.01)
*C10G 11/05* (2006.01)
*B01J 37/28* (2006.01)
*B01J 29/08* (2006.01)
*B01J 29/40* (2006.01)
*B01J 21/16* (2006.01)
*B01J 29/70* (2006.01)
*B01J 29/80* (2006.01)
*B01J 37/06* (2006.01)
*B01J 37/08* (2006.01)
*B01J 37/30* (2006.01)
*B01J 35/00* (2006.01)
*B01J 37/00* (2006.01)
*B01J 29/60* (2006.01)
*B01J 37/04* (2006.01)

(52) U.S. Cl.
CPC ............ *B01J 29/40* (2013.01); *B01J 29/605* (2013.01); *B01J 29/7003* (2013.01); *B01J 29/7007* (2013.01); *B01J 29/7049* (2013.01); *B01J 29/80* (2013.01); *B01J 35/002* (2013.01); *B01J 35/10* (2013.01); *B01J 35/109* (2013.01); *B01J 37/0018* (2013.01); *B01J 37/0045* (2013.01); *B01J 37/06* (2013.01); *B01J 37/08* (2013.01); *B01J 37/28* (2013.01); *B01J 37/30* (2013.01); *C01B 39/026* (2013.01); *C01B 39/24* (2013.01); *C10G 11/05* (2013.01); *B01J 37/04* (2013.01); *B01J 2229/18* (2013.01); *B01J 2229/186* (2013.01); *B01J 2229/36* (2013.01); *B01J 2229/37* (2013.01); *B01J 2229/40* (2013.01); *B01J 2229/42* (2013.01); *C10G 2400/30* (2013.01)

(58) Field of Classification Search
CPC ...... B01J 2229/42; B01J 35/10; B01J 35/109; B01J 37/30; B01J 37/28; B01J 2229/186; C01B 39/24; C01B 39/026

USPC .................................. 502/60, 65, 73, 79, 85
See application file for complete search history.

(56) References Cited

FOREIGN PATENT DOCUMENTS

| | | |
|---|---|---|
| CN | 1224044 A | 7/1999 |
| CN | 1317547 A | 10/2001 |
| CN | 1075466 C | 11/2001 |
| CN | 1325940 A | 12/2001 |
| CN | 1330981 A | 1/2002 |
| CN | 1353086 A | 6/2002 |
| CN | 1436728 A | 8/2003 |
| CN | 1485136 A | 3/2004 |
| CN | 1506161 A | 6/2004 |
| CN | 1201864 C | 5/2005 |
| CN | 1307098 C | 3/2007 |
| CN | 1322928 C | 6/2007 |
| CN | 100344374 C | 10/2007 |
| CN | 101190416 A | 6/2008 |
| CN | 101285001 A | 10/2008 |
| CN | 101391780 A | 3/2009 |
| CN | 102133542 A | 7/2011 |
| EP | 2860157 A1 | 12/2015 |
| JP | S63150231 A | 6/1988 |
| JP | H08229405 A | 9/1996 |
| JP | 2012503065 A | 2/2012 |

OTHER PUBLICATIONS

Communication Pursuant to Article 94(3) EPC issued in Application No. 12877707.5, dated Dec. 21, 2016.
International Search Report issued in International Application No. PCT/CN2012/001008 dated Feb. 1, 2013 (3 pages).
Written Opinion of the International Searching Authority issued in International Application No. PCT/CN2012/001008 dated Mar. 7, 2013 (6 pages).
Copending U.S. Appl. No. 14/404,774, filed Dec. 1, 2014 and the prosecution history thereof.
International Search Report issued in International Application No. PCT/CN2012/001007 dated Feb. 5, 2013 (3 pages).
Written Opinion of the International Searching Authority issued in International Application No. PCT/CN2012/001007 dated Mar. 14, 2013 (10 pages).

* cited by examiner

CATALYTIC CRACKING CATALYST FOR HIGH-EFFICIENCY CONVERSION OF HEAVY OIL AND PREPARATION METHOD THEREOF

FIELD OF TECHNOLOGY

The present invention relates to a catalytic cracking catalyst for heavy oil with a high heavy-oil-conversion capability and a preparation method thereof, and more specifically, to a catalytic cracking catalyst suitable for residual oil blending and a preparation method thereof.

BACKGROUND ART

Catalytic cracking apparatuses are crucial means for crude oil refining, and the economic benefits of refineries depend on the overall product distribution of these apparatuses. Recently, as the growing trend towards crude oils having higher density and poorer quality, a higher heavy-oil-conversion capacity and higher selectivity for valuable products are demanded for FCC catalysts. The cracking activity and activity stability of the Y-type molecular sieve, a major provider of the cracking activity of heavy-oil cracking catalysts, are key factors in determining the heavy-oil-conversion capacity of FCC catalysts.

Therefore, in order to improve the cracking activity and activity stability of Y-type molecular sieves, extensive investigations have been carried out in domestic and abroad research institutes. Currently, it is largely agreed that the framework structural stability and the activity stability of molecular sieves can be improved by localizing as many rare earth ions as possible in sodalite cages in the process of rare earth modification of molecular sieves so as to suppress dealumination of the molecular sieve framework during steam aging. Chinese Patent No. ZL200410058089.3 describes a method for preparing rare earth-modified Y-type molecular sieves, comprising steps of adjusting the pH of the system to 8-11 using an alkali solution after completion of the rare earth exchange reaction, and then carrying out conventional subsequent treatment processes. In the molecular sieves prepared by this method, rare earth ions are completely located in small cages (sodalite cages). Chinese Patent No. ZL200410058090.6 describes the reaction performance of the molecular sieves described in ZL200410058089.3, wherein the catalyst reaction results show that localization of rare earth metals in sodalite cages improves the structural stability and the activity stability of the molecular sieves, manifested in that the heavy-oil-conversion capacity of the catalyst is greatly improved; however, this catalyst has poor coke selectivity.

Chinese patent No. ZL97122039.5 describes a preparation method of ultrastable Y-type zeolites, comprising steps of contacting a Y-type zeolite with an acid solution and an ammonium-containing solution, and subjecting them to a high-temperature steam treatment, wherein the amount of the acid used is 1.5 to 6 moles of hydrogen ions per mole of framework aluminum, the concentration of the acid solution is 0.1 to 5 N/L, the Y-type zeolite is kept in contact with the acid solution at a temperature of 5 to 100° C. for a duration of 0.5 to 72 h, and the weight ratio between the Y-type zeolite and the ammonium ion is 2 to 20. The modification method involved in above patent requires addition of an ammonium-containing solution for the purpose of lowering the sodium oxide content in the molecular sieve or reducing the damage to the molecular sieve structure caused by acidic gases during calcination. Although FCC catalysts made from this molecular sieve are characterized by a high heavy-oil-conversion capacity and a high yield of light oils, this molecular sieve modification technique has the following technical disadvantages: 1) since a large number of ammonium ions are added in the preparation process, ammonium-containing ions would eventually enter the atmosphere or waste water, increasing ammonia nitrogen pollution and the cost for pollution control; 2) the method of above patent is unable to effectively solve the issue of particle agglomeration in a molecular sieve, which issue reduces specific surface area and pore volume of the molecular sieve and increases the obstruction in the pore channel during exchange in the molecular sieve, making it difficult to accurately and quantitatively localize the element for modification in the cages of the molecular sieve; 3) moreover, in above patent it is further mentioned that rare earth ions may also be introduced by ion exchange, during or after the contact between the Y-type zeolite and the ammonium-containing solution, and that during the ion exchange, ammonium ions compete with rare earth ions and preferentially take up the positions intended for rare earth ions, thereby hindering rare earth ions from entering the cages of the molecular sieve by exchange, and also lowering the utilization of rare earth ions.

Chinese patent No. ZL02103909.7 describes a method for preparing rare earth-containing ultrastable Y-type molecular sieves by subjecting a NaY molecular sieve to one exchange process and one calcination process, characterized in that the NaY molecular sieve is placed in an ammonium-containing solution and subjected to chemical dealumination by a chemical dealumination chelating agent containing oxalic acid and/or oxalate salts at 25 to 100° C. for 0.5 to 5 h, a rare earth solution is then introduced under stirring to produce a rare earth precipitate that contains rare earth oxalate, and the precipitate is filtered and water-washed to give a filter cake, followed by a hydrothermal treatment to afford the molecular sieve product. Although the molecular sieve prepared by this method has certain resistance to vanadium contamination, it has relatively low activity stability and cracking activity, and is insufficient to meet the requirement set out by the growing trend towards crude oils having higher density and poorer quality. This is mainly attributed to the position distribution of rare earth ions in the super-cages and sodalite cages of the molecular sieve during its modification. This method demonstrates that rare earth ions are present in the molecular sieve system in two forms, i.e., a part of the rare earth enters sodalite cages in an ionic form, while the other part is dispersed on the surface of the molecular sieve as an independent phase of rare earth oxide (the precursor of which is rare earth oxalate and is converted into rare earth oxide after subsequent calcination), which reduces the stabilizing and supporting effect of rare earth ions on the molecular sieve structure. Furthermore, this method also poses a remarkable problem of ammonium nitrogen pollution, and the oxalic acid or oxalate salts added are also toxic and detrimental to the environment and human.

CN200110029875.0 discloses a preparation method of a rare earth ultrastable Y-type zeolite, characterized in that this method includes a step of treating zeolite with a mixed solution of a rare earth salt and citric acid or with a mixed solution of an inorganic ammonium salt, a rare earth salt and citric acid. This method can simplify the process, and the zeolite prepared thereby, when serving as an active component of a cracking catalyst, is advantageous in lowering the olefin content in the catalytically cracked gasoline products, and substantially increasing the yield of the catalytically cracked light oil products. However, this method does not specify the location of rare earth ions in the molecular sieve.

SUMMARY OF THE INVENTION

An objective of the present invention is to provide a novel catalytic cracking catalyst with high heavy-oil-conversion efficiency, and a preparation method thereof. The catalyst is characterized by a high heavy-oil-conversion capacity, a moderate coke selectivity, and a high yield of target products.

The present invention provides a novel catalytic cracking catalyst with high heavy-oil-conversion efficiency, characterized in that, the catalyst composition comprises 2% to 50% by weight of a phosphorus-containing ultrastable rare earth Y-type molecular sieve, 0.5% to 30% by weight of one or more other molecular sieves, 0.5% to 70% by weight of clay, 1.0% to 65% by weight of high-temperature-resistant inorganic oxides, and 0.01% to 12.5% by weight of rare earth oxide; wherein the phosphorus-containing ultrastable rare earth Y-type molecular sieve comprises 1% to 20% by weight of rare earth oxide, not more than 1.2% by weight of sodium oxide, and 0.1% to 5% by weight of phosphorus in terms of P), and has a crystallinity of 51% to 69% and a lattice parameter of 2.449 nm to 2.469 nm. The preparation process of the phosphorus-containing ultrastable rare earth Y-type molecular sieve includes a rare-earth exchange and a dispersing pre-exchange, wherein the rare-earth exchange and the dispersing pre-exchange are carried out in an unlimited sequence, and are carried out consecutively without a calcination process therebetween. The dispersing pre-exchange refers to a process of adjusting the molecular sieve slurry to have a concentration, in terms of a solid content, of 80 to 400 g/L and adding 0.2% to 7% by weight of a dispersing agent for the dispersing pre-exchange at an exchange temperature of 0 to 100° C. for an exchange duration of 0.1 to 1.5 h. The dispersing agent in the dispersing pre-exchange process is any one or more selected from sesbania powder, boric acid, urea, ethanol, polyacrylamide, acetic acid, oxalic acid, adipic acid, formic acid, hydrochloric acid, nitric acid, citric acid, salicylic acid, tartaric acid, benzoic acid, and starch. No ammonium salt is used in the rare-earth exchange or the dispersing pre-exchange.

In the present invention, the methods and conditions for the rare-earth exchange re not particularly limited, and general methods and conditions may be employed.

The present invention further provides a preparation method of the catalytic cracking catalyst for heavy oil, mainly comprising the steps of:

(1) preparation of a phosphorus-containing ultrastable rare earth Y-type molecular sieve, wherein a NaY molecular sieve (preferably with a silica-to-alumina ratio greater than 4.0, and a crystallinity greater than 70%) is used as the raw material, and is subjected to a rare-earth exchange and a dispersing pre-exchange, then the molecular sieve slurry is filtered, water-washed, and subjected to a first calcination to afford a "one-exchanged one-calcinated" rare earth sodium (RE-Na) Y-type molecular sieve, wherein the rare-earth exchange and the dispersing pre-exchange are carried out in an unlimited sequence; and the "one-exchanged one-calcinated" RE-Na Y-type molecular sieve is then subjected to an ammonium salt exchange, a phosphorus modification and a second calcination, so as to obtain a phosphorus-containing ultrastable rare earth Y-type molecular sieve, wherein the ammonium salt exchange and the phosphorus modification are carried out in an unlimited sequence, and are performed consecutively or nonconsecutively, the second calcination is performed after the ammonium salt exchange for reducing sodium, and the phosphorus modification may be performed before or after the second calcination; and (2) preparation of the catalytic cracking catalyst for heavy oil, wherein the above phosphorus-containing ultrastable rare earth Y-type molecular sieve component, clay, and a precursor of a high-temperature resistant inorganic oxide, as well as other raw materials, are mixed, homogenized, shaped by spraying, calcinated and water-washed, to obtain the catalyst product.

In step (1) of the preparation process of the catalytic cracking catalyst for heavy oil according to the present invention, i.e., in the process of obtaining the phosphorus-containing ultrastable rare earth Y-type molecular sieve, between the rare-earth exchange and the dispersing pre-exchange of the NaY molecular sieve, the molecular sieve slurry may or may not be washed and filtered. During the rare-earth exchange, the ratio of $RE_2O_3$/Y-zeolite (by mass) is preferably 0.005 to 0.25, most preferably 0.01 to 0.20; the exchange temperature is 0 to 100° C., most preferably 60 to 95° C.; the exchange pH is 2.5 to 6.0, most preferably 3.5 to 5.5; and the exchange duration is 0.1 to 2 h, most preferably 0.3 to 1.5 h. During the dispersing pre-exchange, the amount of the dispersing agent added is 0.2 to 7% by weight, most preferably 0.2 to 5% by weight; the exchange temperature is 0 to 100° C., most preferably 60 to 95° C.; and the exchange duration is 0.1 to 1.5 h. The molecular sieve slurry after modification is filtered and water-washed to give a filter cake, which is then dried by flash evaporation to a moisture content thereof between 30% and 50%, and eventually calcinated to afford the "one-exchanged one-calcinated" ultrastable RE-Na Y-type molecular sieve, wherein general conditions may be used for the first calcination, for example, a calcination at 350 to 700° C. under 0 to 100% steam for 0.3 to 3.5 h, preferably at 450 to 650° C. under 15 to 100% steam for 0.5 to 2.5 h.

The process for preparing the molecular sieve according to the present invention also includes an ammonium salt exchange and a phosphorus modification, wherein the ammonium salt exchange and the phosphorus modification are carried out in an unlimited sequence, are performed consecutively or nonconsecutively, with or without a calcination process therebetween. The rare-earth exchange, ammonium salt exchange, phosphorus modification, and calcinations (the first and second calcinations) may all employ well-known conditions for modification by exchange and ultrastabilization in the art, which are not particularly limited in the present invention.

The conditions for phosphorus modification are preferably as follows: the molecular sieve slurry is adjusted to have a concentration, in terms of a solid content, of 80 to 400 g/L, and 0.1% to 1.5% by weight (in terms of P) of a phosphorus-containing compound is added thereto to carry out exchange at an exchange temperature of 0 to 300° C. for an exchange duration 0.1 to 1.5 h; during the exchange, the phosphorus-containing compound is any one or more selected from phosphoric acid, phosphorous acid, phosphoric anhydride, diammonium phosphate, monoammonium phosphate, triammonium phosphate, triammonium phosphite, monoammonium phosphite, and aluminum phosphate.

In the process for preparing the phosphorus-containing ultrastable rare earth Y-type molecular sieve according to the present invention, after a "one-exchanged one-calcinated" ultrastable Y molecular sieve is obtained, an ammonium salt exchange and a phosphorus modification are required. For the ammonium salt exchange, conventional conditions can be employed, and a recommended method therefore is as follows: the "one-exchanged one-calcinated" ultrastable RE-Na Y molecular sieve is added into deionized water; the solid content thereof is adjusted to 100 to 400 g/L, wherein the $NH_4^+$/Y zeolite ratio (by mass) is 0.02, to 0.40, preferably 0.02 to 0.30, and the pH is 2.5 to 5.0, preferably 3.0 to 4.5; and a reaction is carried out at 60 to 95° C. for 0.3 to 1.5 h. For the phosphorus modification, the amount of phosphorus-containing compound(s) added is 0.1% to 5% by weight (in terms of elementary P), most preferably 0.2% to 4% by weight (in terms of elementary P); the exchange temperature is 0 to 100° C., most preferably 20 to 80° C.; and the exchange duration is 0.1 to 1.5 h. When the reactions are completed, the molecular sieve slurry is filtered and water-washed, and the resultant filter cake is calcinated at 450 to 700° C. under 0 to 100% steam for 0.3 to 3.5 h, preferably 0.5 to 2.5 h, so as to finally obtain a highly active phosphorus-containing ultrastable rare earth Y-type molecular sieve provided in accordance with the present invention.

In the "one-exchanged one-calcinated" process for the ultrastable rare earth Y-type molecular sieve according to the present invention, tank-type exchange, belt-type exchange and/or filter cake exchange may be employed in the exchange processes of the rare earth exchange and the dispersing pre-exchange. The rare earth exchange may be carried out in which the rare earth compound solution may be divided into several portions, provided that the total amount of rare earth is not changed, to undergo tank-type exchange, belt-type exchange and/or filter cake exchange, i.e., multiple exchanges. Similarly, in the dispersing pre-exchange, the dispersing agent may be divided into several portions, provided that the total amount of the dispersing agent is not changed, to undergo tank-type exchange, belt-type exchange and/or filter cake exchange. When the rare earth exchange and the dispersing pre-exchange are multiple exchanges, these two types of exchange may be carried out alternately.

The rare earth compound according to the present invention may be rare earth chloride, rare earth nitrate or rare earth sulfate, preferably rare earth chloride or rare earth nitrate.

The rare earth according to the present invention may be lanthanum-rich or cerium-rich rare earth, or may be pure lanthanum or pure cerium.

The dispersing agent in the dispersing pre-exchange process according to the present invention is selected from one or more of, preferably two or more of sesbania powder, boric acid, urea, ethanol, polyacrylamide, acetic acid, oxalic acid, adipic acid, formic acid, hydrochloric acid, nitric acid, citric acid, salicylic acid, tartaric acid, benzoic acid, and starch.

The other molecular sieves in the composition of the catalyst according to the present invention are one or more selected from Y-type zeolite, L zeolite, ZSM-5 zeolite, β zeolite, aluminum phosphate zeolite, Ω zeolite, preferably Y-type zeolite, ZSM-5 zeolite and β zeolite, and these zeolites having undergone a conventional physical or chemical modification, including HY, USY, REY, REHY, REUSY, H-ZSM-5, and Hβ.

The clay according to the present invention is one or more selected from kaolin, halloysite, montmorillonite, sepiolite, perlite, and the like. The high-temperature-resistant inorganic oxide is one or more selected from $Al_2O_3$, $SiO_2$, $SiO_2$—$Al_2O_3$, and $AlPO_4$, and the precursor thereof may be one or more selected from silica-alumina gel, silica sol, alumina sol, silica-alumina composite sol, and pseudoboehmite.

The spraying condition according to the present invention is the conventional operation condition for preparation of cracking catalysts and is not limited in the present invention. The post-treatment process is the same as that in the prior art, including catalyst calcination, water-washing, drying, etc., wherein the calcination is preferably calcination of a sprayed microsphere sample at 200 to 700° C., preferably 300 to 650° C., for 0.05 to 4 h, preferably 0.1 to 3.5 h, and the water-washing condition preferably includes a water/catalyst weight ratio of 0.5 to 35, a washing temperature of 20 to 100° C., and a duration of 0.1 to 0.3 h.

DETAILED DESCRIPTION OF PREFERRED EMBODIMENTS

The examples below are used to further explain the features of the present invention but do not limit the scope of the present invention.

I. Method for Analysis and Evaluation Used in Examples
1. Lattice parameter ($a_0$): X-ray diffraction.
2. Crystallinity ($C/C_0$): X-ray diffraction.
3. Silica-to-alumina ratio: X-ray diffraction.
4. $Na_2O$ content: flame photometry.
5. $RE_2O_3$ content: colorimetry.
5. P content: spectrophotometry
7. Microreactor activity: samples were pretreated at 800° C. under 100% steam for 4 hours. The raw material for the reaction was Dagang light diesel, the reaction temperature was 460° C., the reaction duration was 70 seconds, the catalyst load was 5.0 g, the catalyst/oil ratio was 3.2, and the overall conversion percentage was taken as the microreactor activity.
8. ACE heavy oil microreactor: the reaction temperature was 530° C., the catalyst/oil ratio was 5, and the raw oil was Xinjiang oil blended with 30% vacuum residual oil.

II. Specification of Raw Materials Used in Examples
1. NaY molecular sieves: NaY-1 (the silica/alumina ratio: 4.8, crystallinity: 92%), NaY-2 (the silica/alumina ratio: 4.1, crystallinity: 83%), manufactured by Lanzhou Petrochemical Company Catalyst Plant.
2. Ultrastable "one-exchanged one-calcinated" molecular sieve samples: crystallinity being 60%, sodium oxide being 4.3 m %, manufactured by Lanzhou Petrochemical Company, Catalyst Plant.
3. Rare earth solutions: rare earth chloride (rare earth oxide: 277.5 g/L), rare earth nitrate (rare earth oxide: 252 g/L), both of which are industrial grade and purchased from Lanzhou Petrochemical Company, Catalyst Plant.
4. Sesbania powder, boric acid, urea, ethanol, polyacrylamide, oxalic acid, adipic acid, acetic acid, formic acid, hydrochloric acid, nitric acid, citric acid, salicylic acid, tartaric acid, and starch, all of which are chemically pure; ammonium chloride, ammonium nitrate, ammonium sulfate, ammonium oxalate, phosphoric acid, phosphorous acid, phosphoric anhydride, diammonium phosphate, monoammonium phosphate, triammonium phosphate, triammonium phosphite, monoammonium phosphite, and aluminum phosphate, all of which are industrial grade.
5. Pseudoboehmite (Loss on Ignition: 36.2%), kaolin (Loss on Ignition: 16.4%), halloysite (Loss on Ignition: 21.4%), montmorillonite (Loss on Ignition: 15.8%), perlite (Loss on Ignition: 17.6%), all of which are solid; alumina sol with an alumina content of 23.0 weight %; silica sol with a silica content of 24.5 weight %; all of which are industrial grade.
6. REY, REHY, USY, REUSY molecular sieves, all of which are industrial grade, manufactured by Lanzhou Petrochemical Company, Catalyst Plant; β zeolite, industrial grade, manufacture by Fushun Petrochemical Corporation; H-ZSM-5, industrial grade, manufactured by Shanghai Fudan University.

EXAMPLE 1

To a reaction kettle equipped with a heating mantle, 3000 g NaY-1 molecular sieve (dry basis) and a certain amount of deionized water were consecutively added and blended into a slurry having a solid content of 220 g/L, and 82 g boric acid and 105 g sesbania powder were then added thereto. The temperature was then raised to 85° C., and an exchange reaction was carried out for 0.5 h under stirring, followed by filtration and washing. The resultant filter cake was placed in a reaction kettle, and then 1.67 L rare earth chloride was added. The system pH was adjusted to 4.0, the temperature was elevated to 80° C., an exchange reaction was carried out for 0.3 h, and the resultant filter cake was dried by flash evaporation such that the moisture content thereof was 30% to 50%, and was finally calcinated under 70% water vapor at 670° C. for 1.0 h to produce a "one-exchanged one-calcinated" RE-Na Y. To a reaction kettle equipped with a heating mantle, 500 g of the "one-exchanged one-calcinated" ultrastable RE-Na Y-type molecular sieve (dry basis) and a certain amount of deionized water were added to prepare a slurry having a solid content of 120 g/L, to which 120 g ammonium sulfate was added. The system pH was adjusted to 4.2, the temperature was raised to 90° C., and an exchange reaction was carried out for 0.8 h, followed by filtration and washing. The filter cake was beaten, and 115 g diammonium phosphate was added. After thorough mixing, the mixture was calcinated under 80% steam at 560° C. for 2.5 h to produce an active component, a phosphorus-containing rare earth ultrastable Y-type molecular sieve in accordance with the present invention, designated as Modified Molecular Sieve A-1.

To a reaction kettle with water bath heating, 4.381 L water, 1062 g kaolin, 986 g alumina and 63.5 mL HCl were added and thoroughly mixed, and were stirred for 1 hour, followed by consecutive addition of 448 g Modified Molecular Sieve A-1, 63 g H-ZSM-5, and 755 g REUSY, then thoroughly mixed. 1500 g alumina sol was slowly added for gelation, and was then shaped by spraying. The resultant microspheres were calcinated at 400° C. for 0.5 hours. 2 kg calcinated microspheres were weighed, to which 15 kg deionized water was added to carry out washing at 60° C. for 15 min, and were filtered and dried to produce a cracking catalyst prepared in accordance with the present invention, designated as A.

EXAMPLE 2

To a reaction kettle equipped with a heating mantle, 3000 g NaY-1 molecular sieve (dry basis) and a certain amount of deionized water were consecutively added and blended into a slurry having a solid content of 360 g/L, followed by addition of 0.82 L rare earth nitrate thereto. The system pH was adjusted to 3.3, the temperature was raised to 80° C., and an exchange reaction was carried out for 1.5 h, followed by filtration and washing. The resultant filter cake was placed in a reaction kettle, to which 202 g polyacrylamide and 30 g salicylic acid were then added. The temperature was then elevated to 78° C. for a dispersing exchange, and the exchange reaction was carried out for 0.5 h under stirring. The resultant filter cake was dried by flash evaporation such that the moisture content thereof was 30% to 50%, and was finally calcinated under 30% steam at 630° C. for 1.8 h to produce a "one-exchanged one-calcinated" RE-Na Y. To a reaction kettle equipped with a heating mantle, 500 g of the "one-exchanged one-calcinated" ultra-stable RE-Na Y-type molecular sieve (dry basis) and deionized water were added to prepare a slurry having a solid content of 370 g/L, to which 200 g ammonium sulfate was added. The system pH was adjusted to 3.6, the temperature was raised to 90° C., and an exchange reaction was carried out for 1.2 h. Then 64 g diammonium phosphate was added, the system pH was adjusted to 3.6, the temperature was raised to 90° C., and an exchange reaction was carried out for 1.2 h, followed by filtration and washing. The filler cake was calcinated under 20% steam at 600° C. for 0.5 h, followed by filtration and washing. The filler cake was calcinated under 20% steam at 600° C. for 0.5 h, to produce an active component, a phosphorus-containing rare earth ultrastable Y-type molecular sieve according to the present invention, designated as Modified Molecular Sieve B-1.

To a reaction kettle with water bath heating, 4.620 L water, 1024 g kaolin, 971 g pseudoboehmite and 90.8 mL HCl were added and thoroughly mixed, and were stirred for 1 hour, followed by consecutive addition of 338 g Modified Molecular Sieve B-1, 129 g zeolite, and 806 g REHY, then thoroughly mixed. 1304 g alumina sol was slowly added for gelation, and was then shaped by spraying. The resultant microspheres were calcinated at 400° C. for 1.0 h. 2 kg calcinated microspheres were weighed, to which 20 kg deionized water was added and stirred uniformly, followed by washing at 35° C. for 40 min, and were filtered and dried to produce a cracking catalyst prepared by the present invention, designated as B.

EXAMPLE 3

To a reaction kettle equipped with a heating mantle, 3000 g NaY-1 molecular sieve dry basis) and deionized water were consecutively added and blended into a slurry having a solid content of 150 g/L. 43 g HCl was then added thereto, and a reaction was carried out at 85° C. for 1 h. Then 1.68 L rare earth chloride was added, the system pH was adjusted to 3.7, the temperature was raised to 90° C., and an exchange reaction was carried out for 1 h. Subsequently, the molecular sieve slurry was filtered and subjected to a belt-type exchange with a dispersing agent under the following belt-type exchange conditions: 35 g oxalic acid was formulated into a solution of pH=3.4, the temperature was raised to 85° C., and the vacuum degree in the belt-type filter was 0.04. The resultant filter cake was then dried by flash evaporation such that the moisture content thereof was 30% to 50%, and was finally calcinated under 10% steam at 510° C. for 2.0 h to produce a "one-exchanged one-calcinated" ultrastable RE-Na Y. To a reaction kettle equipped with a heating mantle, 500 g of the "one-exchanged one-calcinated" ultra-stable RE-Na Y-type molecular sieve (dry basis) and deionized water were added to prepare a slurry having a solid content of 145 g/L, to which 80 g ammonium sulfate was added. The system pH was adjusted to 3.5, the temperature was raised to 90° C., and an exchange reaction was carried out for 1.2 h, followed by filtration and washing. The filter cake was calcinated under 50% steam at 650° C. for 2 h, and then rebeaten, and 110 g ammonium dihydrogen phosphate was added and thoroughly mixed. An exchange reaction was carried out for 1 h, followed by filtration, washing and drying, so as to produce the active component of a phosphorus-containing rare earth ultra-stable Y molecular sieve according to the present invention, designated as Modified Molecular Sieve C-1.

To a reaction kettle with water bath heating, 4.854 L water, 1125 g halloysite, 825 g pseudoboehmite and 51.4 mL HCl were added and thoroughly mixed, and were stirred for 1 hour, followed by consecutive addition of 456 g Modified Molecular Sieve C-1 and 903 g USY, then thoroughly mixed. 1224 g silica sol was slowly added for gelation, and was then shaped by spraying. The resultant microspheres were calcinated at 600° C. for 0.3 h. 2 kg calcinated microspheres were weighted, to which 15 kg deionized water was added, followed by washing at 80° C. for 30 min, and were filtered and dried to produce a cracking catalyst prepared in accordance with the present invention, designated as C.

EXAMPLE 4

To a reaction kettle equipped with a heating mantle, 3000 g NaY-1 molecular sieve (dry basis) and a certain amount of deionized water were consecutively added and blended into a slurry having a solid content of 320 g/L. 30 g nitric acid was then added thereto. The temperature was then raised to 85° C., and an exchange reaction was carried out for 0.8 h under stirring, followed by addition of 0.95 L rare earth nitrate. The system pH was adjusted to 3.3, the temperature was elevated to 80° C., an exchange reaction was carried out for 1.8 h. Then 62 g starch was added, and a reaction was carried out at 80° C. for 0.5 h, followed by filtration and washing. The resultant filter cake was dried by flash evaporation such that the moisture content thereof was 30% to 50%, and was finally calcinated under 60% steam at 560° C. for 2 h to produce a "one-exchanged one-calcinated" RE-Na Y. To a reaction kettle equipped with a heating mantle, 500 g of the "one-exchanged one-calcinated" ultrastable RE-Na Y-type molecular sieve (dry basis) and deionized water were added to prepare a slurry having a solid content of 280 g/L, to which 130 g ammonium sulfate was added. The system pH was adjusted to 4.0, the temperature was raised to 90° C., and an exchange reaction was carried out for 0.5 h, followed by filtration and washing. Then 55 g diammonium phosphate was added, and a reaction was carried out for 2 h, followed by filtration and washing. The filter cake was calcinated under 50% steam at 650° C. for 2 h to produce an active component, a phosphorus-containing rare earth ultrastable Y-type molecular sieve in accordance with the present invention, designated as Modified Molecular Sieve D-1.

To a reaction kettle with water bath heating, 4.577 L water, 1055 g kaolin, 983 g alumina and 63.5 ml HCl were added and thoroughly mixed, and were stirred for 1 hour, followed by consecutive addition of 892 g Modified Molecular Sieve D-1, 63 g ZSM-5 zeolite, 118 g USY and 188 g REY, then thoroughly mixed. 1500 g alumina sol was slowly added for gelation, and was then shaped by spraying. The resultant microspheres were calcinated at 400° C. for 0.5 h. 2 kg calcinated microspheres were weighed, to which 10 kg deionized water was added, followed by washing at 40° C. for 20 min, and were filtered and dried to produce a cracking catalyst prepared by the present invention, designated as D.

EXAMPLE 5

To a reaction kettle equipped with a heating mantle, 3000 g NaY-1 molecular sieve (dry basis) and a certain amount of deionized water were consecutively added and blended into a slurry having a solid content of 350 g/L. 42 g citric acid and 28 g sesbania powder were then added thereto. The temperature was raised to 82° C., and an exchange reaction was carried out for 1.3 h under stirring. When the reaction was completed, 0.56 L rare earth nitrate was added, and an exchange reaction was carried out at 85° C. for 0.8 h. Subsequently, the molecular sieve slurry was filtered and subjected to a belt-type exchange under the following conditions: the temperature of the rare earth nitrate solution was raised to 88° C., the pH for exchange was 4.7, the rare earth nitrate was added in a $RE_2O_3$/Y zeolite ratio (by mass) of 0.04, and the vacuum degree in the belt-type filter was 0.03. The resultant filter cake was then dried by flash evaporation such that the moisture content thereof was 30% to 50%, and was finally calcinated under 80% steam at 530° C. for 1.5 h to produce a "one-exchanged one-calcinated" ultrastable RE-Na Y. To a reaction kettle equipped with a heating mantle, 500 g of the "one-exchanged one-calcinated" ultrastable RE-Na Y-type molecular sieve (dry basis) and deionized water were added to prepare a slurry having a solid content of 150 g/L, to which 100 g ammonium sulfate was added. The system pH was adjusted to 4.0, the temperature was raised to 90° C., and an exchange reaction was carried out for 1 h, followed by filtration and washing. The filter cake was calcinated under 60% steam at 620° C. for 2 h, then rebeaten, and 55 diammonium phosphate was added and thoroughly mixed, reacted at 90° C. for 1.5 h, and subjected to a calcination under 100% steam at 620° C. for 2 h, so as to produce an active component, a phosphorus-containing rare earth ultrastable Y-type molecular sieve in accordance with the present invention, designated as Modified Molecular Sieve E-1.

To a reaction kettle with water bath heating, 6.5 L water, 995 g kaolin, 676 g alumina and 130 ml HCl were added and thoroughly mixed, and were stirred for 1 hour, followed by consecutive addition of 558 g Modified Molecular Sieve E-1, 19 g H-ZSM-5, and 830 g REUSY, then thoroughly mixed. 1359 g alumina sol was slowly added for gelation, and was then shaped by spraying. The resultant microspheres were calcinated at 500° C. for 0.6 h. 2 kg calcinated microspheres were weighed, to which 19 kg deionized water was added, followed by washing at 80° C. for 10 min, and were filtered and dried to produce a cracking catalyst prepared in accordance with the present invention, designated as E.

COMPARATIVE EXAMPLE 1

A REUSY molecular sieve was prepared by the same method as that shown in Example 3, with the only exception that HCl and oxalic acid were not added. The resultant ultrastable rare earth Y-type molecular sieve is designated as F-1, and the resultant catalyst is designated as F.

COMPARATIVE EXAMPLE 2

In this comparative example, the molecular sieve preparation method described in CN200510114495.1 was used in order to examine the reaction performance of this molecular sieve. The preparation process of the catalyst was the same as that in Example 5.

3000 g (dry basis) ultrastable "one-exchanged one-calcinated" molecular sieve sample ($Na_2O$ content: 1.4 weight %, $RE_2O_3$ content: 8.6 weight %, lattice parameter: 2.468 nm, relative crystallinity: 62%) produced hydrothermally by the Lanzhou Petrochemical Company, Catalyst Plant was added into a 3 L aqueous solution of 2N oxalic acid, and was stirred and thoroughly mixed. The temperature was raised to 90 to 100° C., and a reaction was carried out for 1 hour, followed by filtration and washing. The resultant filter cake was placed into 6 L deionized water, to which a 1.46 L solution of rare earth nitrate was added. The temperature was raised to 90 to 95° C., at which a reaction was carried out for 1 hour, followed by filtration and washing. The filter cake was oven dried at 120° C. to afford the molecular sieve sample of this comparative example, designated as H-1.

To a reaction kettle with water bath heating, 6.5 L water, 995 g kaolin, 676 g alumina and 130 mL HCl were added and thoroughly mixed, and were stirred for 1 hour, followed by consecutive addition of 558 g Modified Molecular Sieve H-1, 19 g H-ZSM-5, and 830 g REUSY, then thoroughly mixed. 1359 g alumina sol was slowly added for gelation, and was then shaped by spraying. The resultant microspheres were calcinated at 500° C. for 0.6 h. 2 kg calcinated microspheres were weighed, to which 19 kg deionized water was added, followed by washing at 80° C. for 10 min, and were filtered and dried to produce a cracking catalyst of this comparative example, designated as H.

COMPARATIVE EXAMPLE 3

A REUSY molecular sieve was prepared by the same method as that shown in Example 5, with the only exception that citric acid and sesbania powder were not added. The resultant ultrastable rare earth Y-type molecular sieve is designated as G-1, and the resultant catalyst is designated as G.

The physical and chemical properties of the ultrastable rare earth Y-type molecular sieves obtained in accordance with the Examples and Comparative examples of the present invention are listed in Table 1. The analysis result demonstrates that the novel molecular sieves are characterized by good structural stability and a small particle size, as compared to the comparative examples.

TABLE 1

Analysis of physical and chemical properties of molecular sieves

| Item | | Molecular Sieve No. | Rare Earth Oxide m % | Phosphorus m % | Sodium Oxide m % | Lattice Parameter nm | Relative Crystallinity % | Retention rate of Relative Crystallinity % | Collapse Temp. ° C. |
|---|---|---|---|---|---|---|---|---|---|
| Examples | | A-1 | 15.45 | 0.96 | 1.1 | 2.470 | 50 | 68.4 | 1019 |
| | | B-1 | 6.89 | 0.58 | 0.94 | 2.472 | 54 | 71.1 | 1022 |
| | | C-1 | 15.54 | 1.1 | 0.92 | 2.479 | 56 | 73.2 | 1018 |
| | | D-1 | 7.98 | 0.54 | 1.05 | 2.473 | 51 | 72.3 | 1025 |
| | | E-1 | 8.70 | 0.58 | 0.86 | 2.473 | 53 | 67.8 | 1017 |
| Comparative | | F-1 | 6.78 | 1.05 | 1.1 | 2.464 | 52 | 51.2 | 998 |
| Examples | | H-1 | 8.27 | 0.52 | 1.60 | 2.467 | 54 | 54.5 | 1002 |
| | | G-1 | 8.70 | 0.58 | 0.82 | 2.468 | 52 | 56.3 | 1000 |

The results for evaluation of the reaction performance of the catalysts prepared in Examples 1 to 5 and the Comparative Examples are listed in Table 2.

TABLE 2

Evaluation results for the microreactor activity for ACE heavy oil

| | | Catalyst No. | | | | | | | |
|---|---|---|---|---|---|---|---|---|---|
| | | A | B | C | D | E | F | H | G |
| | | | | | Molecular sieves | | | | |
| | | A-1 | B-1 | C-1 | D-1 | E-1 | F-1 | H-1 | G-1 |
| Mass balance m % | Dry gas | 2.79 | 2.72 | 2.72 | 2.75 | 2.75 | 2.81 | 2.90 | 2.84 |
| | Liquified gas | 22.48 | 22.52 | 22.44 | 22.42 | 22.42 | 23.26 | 23.59 | 23.22 |
| | Gasoline | 53.41 | 52.76 | 53.26 | 53.57 | 53.57 | 52.92 | 52.84 | 53.22 |
| | Diesel | 10.88 | 11.10 | 11.07 | 10.87 | 10.87 | 9.82 | 9.69 | 9.99 |
| | Heavy oil | 3.97 | 4.67 | 4.32 | 4.15 | 4.15 | 4.31 | 3.94 | 4.11 |
| | Coke | 6.46 | 6.22 | 6.18 | 6.23 | 6.23 | 6.88 | 7.05 | 6.61 |
| | Total | 100 | 100 | 100 | 100 | 100 | 100 | 100 | 100 |
| Conversion, m % | | 85.14 | 84.23 | 84.61 | 84.97 | 84.97 | 85.87 | 86.38 | 85.90 |
| Total liquid yield, m % | | 86.78 | 86.38 | 86.78 | 86.87 | 86.87 | 86.00 | 86.11 | 86.44 |
| Light oil yield, m % | | 64.29 | 63.86 | 64.33 | 64.45 | 64.45 | 62.75 | 62.52 | 63.21 |

From the evaluation results about the microreactor activity for ACE heavy oil, it can be seen that the catalysts prepared by the methods according to the present invention have a superior heavy-oil-conversion capacity and coke selectivity, as compared to comparative catalysts, and also have a total liquid yield and a light oil yield both significantly higher than those of the comparative catalysts. Table 4 shows the evaluation results of catalyst B in a riser. As compared to catalyst G, using the catalyst of the present invention, the total liquid yield can be increased by 0.97%, and the light yield can be increased by 0.77%, while the gasoline properties in both cases are similar.

TABLE 4

Evaluation results of a catalyst riser

| | Catalysts | Comparative catalyst G | Inventive catalyst |
|---|---|---|---|
| Mass balance, ω % | Dry gas (H2-C2) | 1.05 | 1.17 |
| | Liquified gas (C3-C4) | 17.95 | 18.16 |
| | Gasoline (C5-204° C.) | 50.20 | 50.44 |
| | Diesel (204° C.-350° C.) | 16.58 | 17.12 |
| | Heavy oil (>350° C.) | 6.54 | 5.55 |
| | Coke | 7.36 | 7.30 |
| | Loss | 0.30 | 0.27 |
| Selectivity ω % | Conversion | 76.87 | 77.33 |
| | Light oil yield | 66.79 | 67.56 |
| | Total liquid yield | 84.74 | 85.71 |

TABLE 4-continued

Evaluation results of a catalyst riser

| | Catalysts | Comparative catalyst G | Inventive catalyst |
|---|---|---|---|
| Gasoline composition ω % | Normal alkanes | 4.48 | 4.34 |
| | Isoalkanes | 23.75 | 24.50 |
| | Gasoline olefins | 45.05 | 44.00 |
| | Cycloalkanes | 9.97 | 10.01 |
| | Aromatic hydrocarbons | 16.75 | 17.15 |
| Gasoline MON | | 83.40 | 83.42 |
| Gasoline RON | | 93.69 | 93.82 |

INDUSTRIAL APPLICABILITY

One of the major active components of the novel catalyst for heavy oil according to the present invention is a phosphorus-containing rare earth ultrastable Y-type molecular sieve having high cracking activity stability. In the process of preparing this molecular sieve by rare earth modification, a dispersing agent is used to pre-disperse NaY molecular sieves, thereby lowering the degree of agglomeration of molecular sieve particles, allowing more molecular sieve surface to be in contact with rare earth ions, and reducing the obstruction to rare earth ion exchange. As a result, more rare earth ions are exchanged into molecular sieve cages and then migrate into sodalite cages in the subsequent steam calcination process, thereby the structural stability and activity stability of the molecular sieve are improved. As rare earth ions are located in sodalite cages, there are no rare earth ions present in super-cages or on the surface of the molecular sieve, thereby reducing the acidic intensity and density in these sites, lowering the coking probability at these active sites, and satisfactorily resolving the conflict between the heavy-oil conversion capacity and the coke selectivity of catalysts.

What is claimed is:

1. A catalytic cracking catalyst for heavy oil, characterized in that the catalyst composition comprises
   2% to 50% by weight of a phosphorus-containing ultrastable rare earth Y-type molecular sieve,
   0.5% to 30% by weight of one or more other molecular sieves,
   0.5% to 70% by weight of clay,
   1.0% to 65% by weight of high-temperature resistant inorganic oxides, and
   0.01% to 12.5% by weight of rare earth oxide;
   wherein the phosphorus-containing ultrastable rare earth Y-type molecular sieve comprises 1% to 20% by weight of rare earth oxide, not more than 1.2% by weight of sodium oxide, and 0.1% to 5% by weight of phosphorus in terms of P, and has a crystallinity of 51% to 69%, and a lattice parameter of 2.449 nm to 2.469 nm;
   wherein the phosphorus-containing ultrastable rare earth Y-type molecular sieve is prepared by a process comprising,
   (a) treating a NaY-type molecular sieve to a rare-earth exchange, a dispersing pre-exchange, and a first calcination to afford a "one-exchanged one-calcinated" rare earth sodium Y-type molecular sieve, wherein the rare-earth exchange and the dispersing pre-exchange are carried out in an unlimited sequence, and are carried out consecutively without a calcination process therebetween; and
   subjecting the "one-exchanged one-calcinated" rare earth sodium Y-type molecular sieve to an ammonium salt exchange, a phosphorus modification and a second calcination to obtain a phosphorous-containing ultrastable rare earth Y-type molecular sieve, wherein the ammonium salt exchange and the phosphorus modification are carried out in an unlimited sequence, and the second calcination is performed after the ammonium salt exchange; and
   (b) mixing the phosphorus-containing ultrastable rare earth Y-type molecular sieve, clay, and a precursor of a high-temperature resistant inorganic oxide to obtain a mixture, and homogenizing, spraying, and calcinating the mixture to obtain the catalyst cracking catalyst,
   wherein a dispersing agent in the dispersing pre-exchange process is any one or more selected from sesbania powder, boric acid, urea, ethanol, polyacrylamide, acetic acid, oxalic acid, adipic acid, formic acid, hydrochloric acid, nitric acid, citric acid, salicylic acid, tartaric acid, benzoic acid, and starch; and wherein no ammonium salt is used in the rare earth exchange or the dispersing pre-exchange.

2. The catalytic cracking catalyst for heavy oil according to claim 1, wherein the dispersing pre-exchange comprises adding the dispersing agent in an amount of 0.2% to 5% by weight, an exchange temperature is 60° C. to 95° C., and an exchange duration is 0.1 to 1.5 h.

3. The catalytic cracking catalyst for heavy oil according to claim 1, wherein the one or more other molecular sieves are selected from one or more of Y-type zeolite or a modification thereof, L zeolite or a modification thereof, ZSM-5 zeolite or a modification thereof, β zeolite or a modification thereof, aluminum phosphate zeolite or a modification thereof, and Ω zeolite or a modification thereof, wherein the modification to the molecular sieves is selected from the group consisting of HY, USY, REY, REHY, REUSY, H-ZSM-5, and Hβ.

4. The catalytic cracking catalyst for heavy oil according to claim 1, wherein the clay is selected from one or more of kaolin, halloysite, montmorillonite, sepiolite, and perlite.

5. The catalytic cracking catalyst for heavy oil according to claim 1, wherein the high-temperature-resistant inorganic oxide is selected from one or more of $Al_2O_3$, $SiO_2$, $SiO_2$—$Al_2O_3$, and $AlPO_4$.

6. A preparation method of the catalytic cracking catalyst for heavy oil comprising 2% to 50% by weight of a phosphorus-containing ultrastable rare earth Y-type molecular sieve, 0.5% to 30% by weight of one or more other molecular sieves, 0.5% to 70% by weight of clay, 1.0% to 65% by weight of high-temperature resistant inorganic oxides, and 0.01% to 12.5% by weight of rare earth oxide; wherein the phosphorus-containing ultrastable rare earth Y-type molecular sieve comprises 1% to 20% by weight of rare earth oxide, not more than 1.2% by weight of sodium oxide, and 0.1% to 5% by weight of phosphorus in terms of P, and has a crystallinity of 51% to 69%, and a lattice parameter of 2.449 nm to 2.469 nm, wherein the method comprises the steps of:
   (1) preparing a phosphorus-containing ultrastable rare earth Y-type molecular sieve from a NaY molecular sieve comprising a rare-earth exchange, a dispersing pre-exchange, and a first calcination to afford a "one-exchanged one-calcinated" rare earth sodium Y-type molecular sieve, wherein the rare-earth exchange and the dispersing pre-exchange are carried out in an unlimited sequence; and
   subjecting the "one-exchanged one-calcinated" rare earth sodium Y-type molecular sieve to an ammonium salt exchange, a phosphorus modification and a second calcination to obtain a phosphorous-containing ultrastable rare earth Y-type molecular sieve, wherein the ammonium salt exchange and the phosphorus modification are carried out in an unlimited sequence, and the second calcination is performed after the ammonium salt exchange; and
   (2) mixing the phosphorus-containing ultrastable rare earth Y-type molecular sieve, clay, and a precursor of a high-temperature resistant inorganic oxide to obtain a mixture, and homogenizing, spraying, and calcinating the mixture to obtain the catalyst cracking catalyst,
   wherein a dispersing agent in the dispersing pre-exchange process is any one or more selected from sesbania powder, boric acid, urea, ethanol, polyacrylamide, acetic acid, oxalic acid, adipic acid, formic acid, hydrochloric acid, nitric acid, citric acid, salicylic acid, tartaric acid, benzoic acid, and starch; and wherein no ammonium salt is used in the rare earth exchange or the dispersing pre-exchange.

7. The preparation method according to claim 6, wherein the rare-earth exchange comprises
   adding a rare earth compound, wherein the mass ratio of the rare earth oxide ($RE_2O_3$) equivalent of the rare earth compound to Y zeolite is 0.005 to 0.25,
   an exchange temperature of 0 to 100° C.,
   an exchange pH of 2.5 to 6.0, and
   an exchange duration of 0.1 to 2 h.

8. The preparation method according to claim 7, wherein the mass ratio of $RE_2O_3$ to Y zeolite is 0.01 to 0.20, the exchange temperature is 60° C. to 95° C., the exchange pH is 3.5 to 5.5, and the exchange duration is 0.3 to 1.5 h.

9. The preparation method according to claim 6, wherein the phosphorus modification comprises
   adjusting the molecular sieve slurry to a concentration, in terms of a solid content, of 80 to 400 g/L, and adding 0.1% to 5% by weight of phosphorus-containing compound in terms of P for an exchange at an exchange temperature of 0 to 100° C. for an exchange duration of 0.1 to 1.5 h.

10. The preparation method according to claim 8, wherein the phosphorus-containing compound is any one or more selected from phosphoric acid, phosphorous acid, phosphoric anhydride, diammonium phosphate, monoammonium phosphate, triammonium phosphate, triammonium phosphite, monoammonium phosphite, and aluminum phosphate.

11. The preparation method according to claim 6, wherein the rare-earth exchange and the dispersing pre-exchange independently comprises a tank-type exchange, belt-type exchange, filter cake exchange, and combinations thereof.

12. The preparation method according to claim 6, wherein the rare-earth exchange and the dispersing pre-exchange are multiple exchanges.

13. The preparation method according to claim 6, wherein the first calcination is carried out at 350° C. to 700° C. under 0 to 100% steam for 0.3 to 3.5 h.

14. The preparation method according to claim 6, wherein step (1) comprises
treating a slurry of the "one-exchanged one-calcinated" rare earth sodium Y-type molecular sieve to a phosphorus modification exchange first,
filtering to obtain a filter cake therefrom;
mixing the filter cake with an ammonium salt solution to undergo a filter cake exchange, and
calcinating the filter cake.

15. The preparation method according to claim 6, wherein step (1) comprises,
treating a slurry of the "one-exchanged one-calcinated" rare earth sodium Y-type molecular sieve to a phosphorus modification exchange first,
mixing with an ammonium salt solution to undergo an exchange;
filtering to obtain a filter cake therefrom; and
calcinating the filter cake.

16. The preparation method according to claim 6, wherein step (1) comprises,
treating a slurry of the "one-exchanged one-calcinated" rare earth sodium Y-type molecular sieve to an ammonium salt exchange first,
filtering to obtain a filter cake therefrom;
mixing the filter cake with a phosphorus modification solution to undergo a filter cake exchange, and
calcinating the filter cake.

17. The preparation method according to claim 6, wherein step (1) comprises,
treating a slurry of the "one-exchanged one-calcinated" rare earth sodium Y molecular sieve to an ammonium salt exchange first,
mixing with a phosphorus modification solution to undergo an exchange;
filtering to obtain a filter cake; and
calcinating the filter cake.

18. The preparation method according to claim 6, wherein step (1) comprises,
treating a slurry of the "one-exchanged one-calcinated" rare earth sodium Y-type molecular sieve to an ammonium salt exchange first,
filtering to obtain a first filter cake;
calcinating the first filter cake;
mixing the filter cake with a phosphorus modification solution to undergo an exchange;
filtering to obtain a second filter cake; and
calcinating the second filter cake.

19. The preparation method of the catalyst according to claim 6, wherein the calcination in step (2) is carried out at 200° C. to 700° C. for a duration of 0.05 to 4 hours.

20. The preparation method of the catalyst according to claim 6, wherein the precursor of the high-temperature-resistant inorganic oxide in step (2) is one or more selected from silica-alumina gel, silica sol, alumina sol, silica-alumina composite sol, and pseudoboehmite.

* * * * *